E. S. SCHEBLE & E. ASCUE.
COTTON PICKER.
APPLICATION FILED MAY 8, 1911.

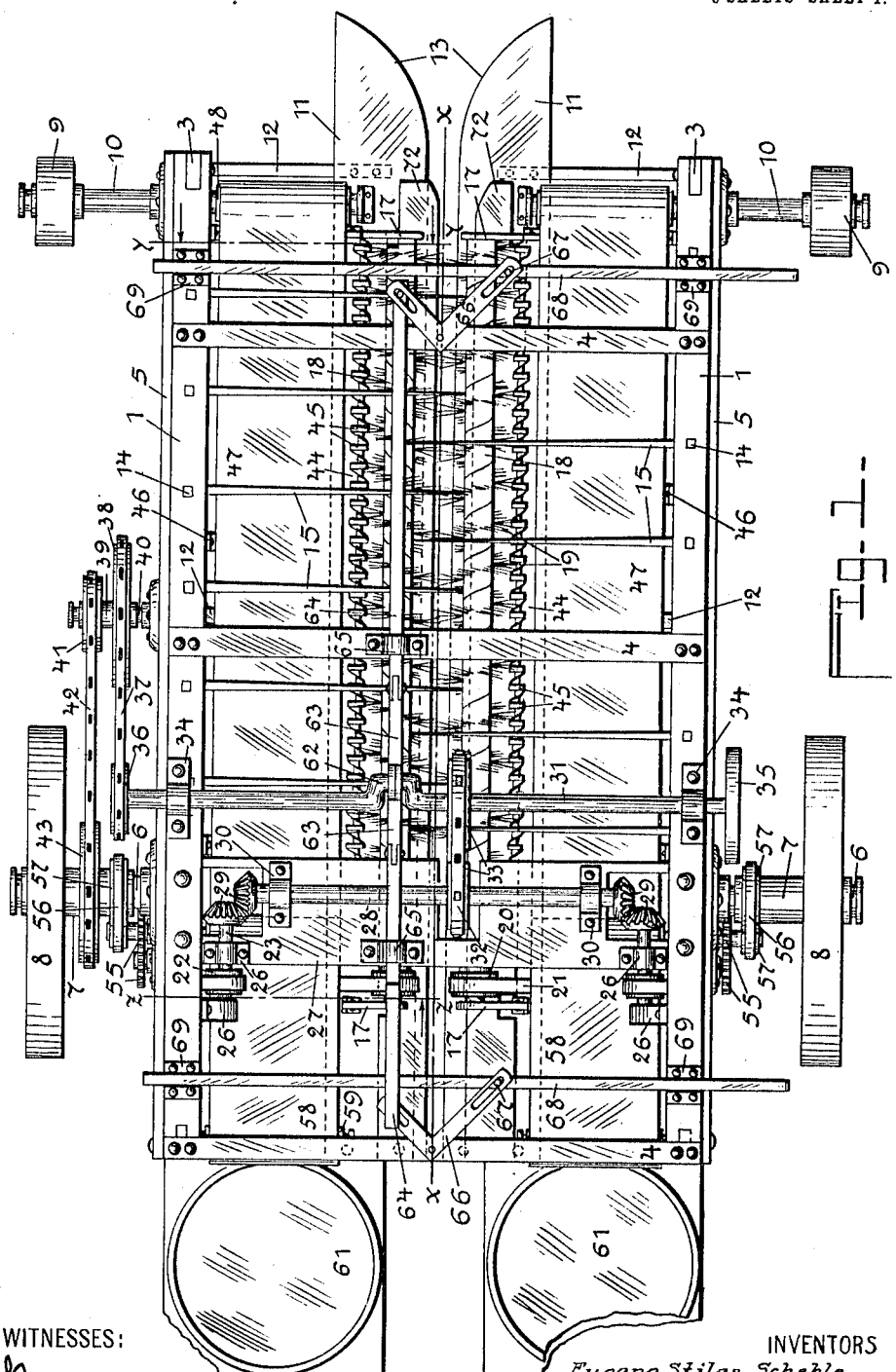

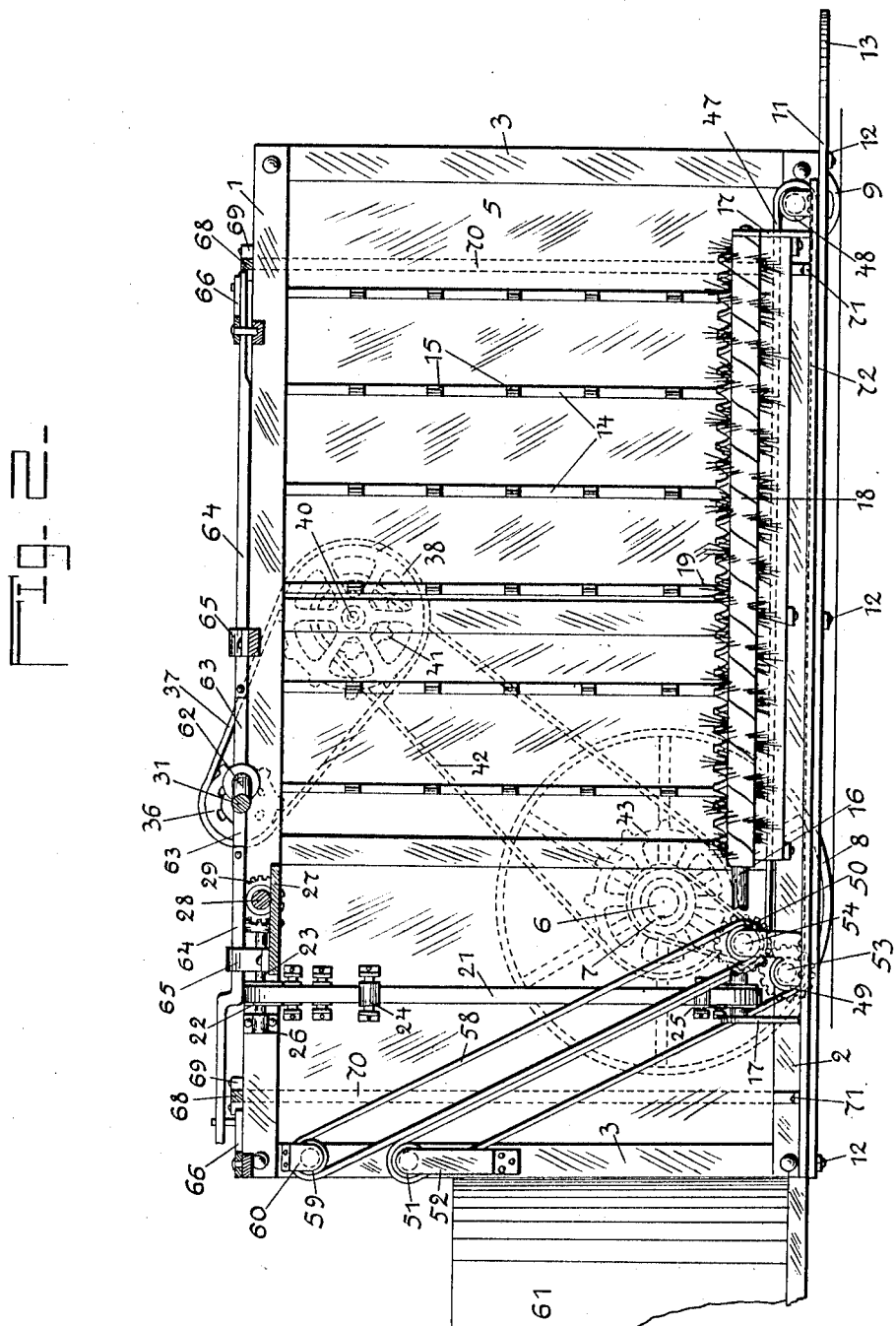

1,020,116.

Patented Mar. 12, 1912.

3 SHEETS—SHEET 3.

WITNESSES:
J. S. Murray
R. S. Smucker

INVENTORS
Eugene Stiles Scheble,
Elbert Ascue.
BY
John M. Spellman
ATTORNEYS

COLUMBIA PLANOGRAPH CO., WASHINGTON, D. C.

UNITED STATES PATENT OFFICE.

EUGENE STILES SCHEBLE, OF CLEBURNE, AND ELBERT ASCUE, OF BLUM, TEXAS; SAID ASCUE ASSIGNOR OF FOUR-FIFTHS OF HIS RIGHT TO SAID SCHEBLE.

COTTON-PICKER.

1,020,116.  Specification of Letters Patent.  Patented Mar. 12, 1912.

Application filed May 8, 1911. Serial No. 625,684.

*To all whom it may concern:*

Be it known that we, EUGENE STILES SCHEBLE and ELBERT ASCUE, both citizens of the United States, the former residing at Cleburne, in the county of Johnson and State of Texas, and ELBERT ASCUE at Blum, Hill county, Texas, have invented certain new and useful Improvements in Cotton-Pickers, of which the following is a specification.

Our invention relates to new and useful improvements in cotton pickers. Its object is to provide a wheeled machine adapted to travel along a row of cotton plants, and to remove the cotton lint from the plants by mechanical means, accomplishing this work at a less expense and more rapidly than can be done by manual labor.

The object is more specifically to provide a cotton picker carrying a plurality of fixed bars, adapted to contact with the branches of the plants during the travel of the machine, and shake loose the lint, bars being employed also to oscillate against the stems of the plants in order to shake them more thoroughly, and rotating brushes being employed to catch the falling lint, and to transfer it to traveling belts by which it is conveyed to suitable hoppers.

Finally the object of the invention is to provide a device of the character described that will be strong, durable, simple and efficient, and comparatively inexpensive to construct, and also one the various parts of which will not be likely to get out of working order.

Figures 3, 4:
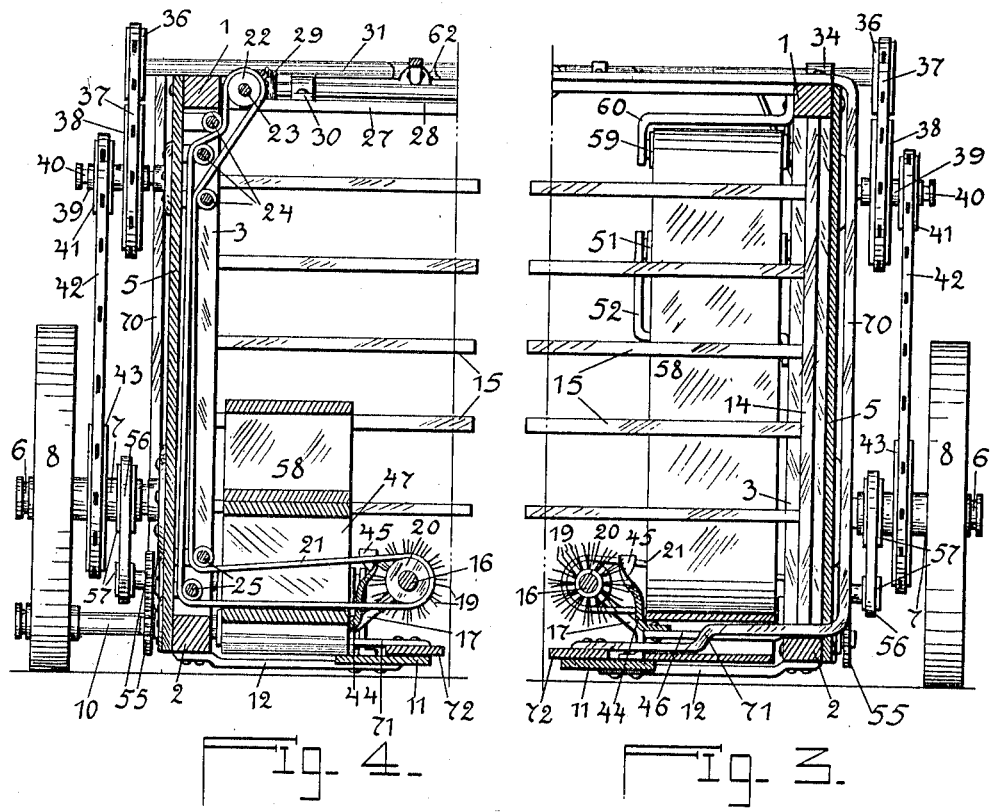
Figure 5:
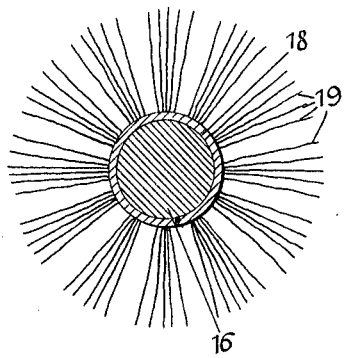
Figure 7:
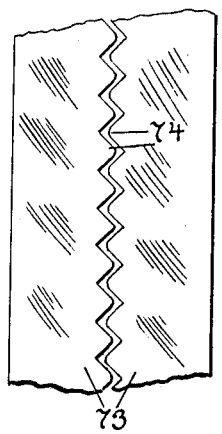
Figure 6:
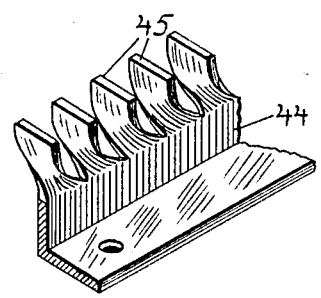

With these and various other objects in view, our invention has relation to certain novel features of the construction and operation, an example of which is described in the following specification and illustrated in the accompanying drawing, wherein:

Figure 1 is a plan view of the cotton picker. Fig. 2 is a longitudinal vertical sectional elevation taken upon the line *x*—*x* of Fig. 1. Fig. 3 is a transverse vertical sectional elevation showing onehalf of the machine, the section being taken upon the line *y*—*y* of Fig. 1. Fig. 4 is a transverse vertical sectional elevation showing onehalf of the machine, the section being taken upon the line *z*—*z* of Fig. 1. Fig. 5 is a detail view in cross section showing one of the elongated rotatable brushes, which are employed to catch the falling lint and to transfer it to conveyer belts. Fig. 6 is a detail perspective view showing a portion of one of the combs, which serve to remove the lint from the brushes and to deposit it on the belts. Fig. 7 illustrates a pair of adjacent boards, having serrated edges, the teeth of one board extending partially between those of the other leaving a zig-zag passageway through which the stem of the cotton plants may be made to travel as the machine passes over the row, thus imparting a rapid oscillating motion to the plants that would serve to efficiently shake the lint therefrom.

Referring now more particularly to the drawings, wherein like numerals of reference designate similar parts in all the figures, the numeral 1 is applied to a pair of elongated parallel beams in the top of the frame, and the numeral 2 denotes a pair of similar elongated beams in the bottom of the frame. The beams 1 and 2 are rigidly connected by vertical beams 3, and a number of cross bars 4 establish a rigid connection between the two bars 1. The frame of the machine will preferably be open except at the two sides, each of which will be provided with a wall 5. Upon the rear lower portions of the walls 5 a pair of brackets are mounted, each of which carries a short axle 6, said axles being in alinement. Each of these axles serves as a journal for the elongated hub 7 of a transporting wheel 8. The forward extremity of the machine is supported by a pair of small transporting wheels 9, rotatably mounted upon axles 10, each of which passes through one of the beams 2, and projects for some distance inward from the beam for a purpose made clear hereinafter. A pair of adjacent horizontal boards 11 are mounted centrally beneath the machine, extending longitudinally thereof and are supported in this position by bracket arms 12, projecting rigidly from the beams 2. As the cotton picker travels along a row of plants, the stems of the plants are intended to pass between the two boards 11, and the forward extremities of these boards are gradually curved outward as indicated at 13, so as to guide the stems of the plants between the boards.

Upon the inner surface of each side wall 5 are provided a plurality of equidistant vertical bars 14, from each of which project a number of horizontal bars 15 perpendicular with the side walls, and extending little more than half way across the machine. The sides of these bars are slightly tapered from their free ends to reduce the weight. As the machine travels along a row the extremities of the bars 15 brush through the cotton plants, shaking the plants thoroughly, so as to dislodge the lint from the bolls. A means will now be described by which the falling lint will be caught, said means consisting in a pair of adjacent cylindrical brushes rotatably mounted in the lower part of the machine above the guide boards 11. The shafts 16 of the brushes have their extremities mounted in brackets 17 secured to the guide boards 11. Upon each shaft is spirally wound a band or webbing 18 of leather or some other suitable material, in which band the bristles of the brushes 19 are set. The two rotatable brushes will be mounted sufficiently close to each other to permit the extremities of the bristles to overlap, so that the lint cannot fall between the brushes. Each of the brush shafts 16 carries a pulley 20 fast upon its rear extremity, and rotation may be communicated to the pulleys 20 through belts 21 from pulleys 22 fast upon shafts 23, which are mounted upon the top of the machine. A group of idler pulleys 24, three in number for each belt, conduct the belts to a position adjacent to the side walls during their vertical travel. A pair of idler pulleys 25 are employed in conjunction with each belt to conduct the same out from the wall to the pulley 20. Each shaft 23 is supported in a pair of bearings 26, one of which is mounted upon one of the beams 1 and the other upon a transverse board or plate 27, supported between the beams 1. Rotation may be communicated to the shafts 23 from a shaft 28, a pair of bevel gears 29 being employed to establish the connection in each case. The shaft 28 is rotatably mounted upon the board 27 transversely of the machine in bearings 30. Rotation is communicated to the shaft 28 from a parallel shaft 31 through a sprocket chain 32, carried by a pair of sprocket wheels 33, one of which is mounted upon each shaft. The shaft 31 is rotatably mounted in bearings 34, one of which is secured to each beam 1, and a fly wheel 35 is carried at one extremity of said shaft. The other extremity of the shaft 31 receives a sprocket wheel 36, over which passes a sprocket chain 37, which passes also over a sprocket wheel 38 fast upon a sleeve 39, rotatable upon a stud shaft 40, forming part of a bracket secured to the side wall of the machine. The sleeve 39 also carries a sprocket wheel 41, over which passes a belt 42, which also passes over a sprocket wheel 43 rigidly mounted upon the hub 7 of one of the wheels 8.

The transmission mechanism just described is adapted to communicate a rotation to the two brushes, such that the same will rotate in opposite directions, the adjacent bristles moving upward. An elongated comb is mounted adjacent to each brush in such a position that the bristles of the brush will pass through the teeth of the comb during rotation, permitting the latter to remove the lint, and to deposit the same upon traveling belts which will be described hereinafter. Each comb consists of an angle iron 44, in one of the walls of which a plurality of slits are made, and the material between the slits twisted at right angles with its original position, forming teeth 45. The combs are supported by bracket arms 46 projecting rigidly from the top surfaces of the beams 2. A traveling conveyer belt 47 is adapted to travel in a horizontal direction adjacent to each comb, between the comb and the side wall of the machine. The rear extremities of the two belts are mounted upon pulleys 48, loose upon the inwardly projecting portion of the front axles 10. Adjacent pulleys 49 and 50 are mounted to the rear of each brush, and after passing under these pulleys, the belt members are deflected upwardly and rearwardly, being finally received by a pulley 51, having one end of its shaft mounted in one of the rear uprights 3, and the other received by a bracket 52, rigidly projecting from said upright. The pulleys 49 and 50 are fast upon shafts 53 and 54 respectively, which pass through the said walls of the machine, and carry a pair of intermeshed gears 55 outside of said walls. Rotation is adapted to be communicated to the uppermost shaft 54 from the hub of the wheel by a belt 56 mounted upon a pair of pulleys 57, one of which is fast upon the hub, and the other upon the shaft 54. The pulley 50 receives the lower end of a belt 58, which extends upwardly and rearwardly parallel to the belt 47 with its lower member contacting with the upper member of said belt 47. The upper end of the belt 58 is rotatably mounted upon a pulley 59 carried by a shaft, one end of which is mounted in one of the uprights 3 at the rear of the machine, and the other end in a bracket 60 rigidly supported from said upright. The transmission mechanism, by which the belts 47 and 58 are operated, is such that the contacting surfaces of the two belts move upwardly and rearwardly at the same rate of travel. This arrangement serves to elevate the cotton lint from the horizontal portion of the belt 47, said lint being firmly pressed between the belts 47 and 58 during its upward travel, so that it cannot escape. At the rear of the machine two cylindrical receptacles 61 are rigidly mounted, their position being such as to adapt them to receive the lint which is discharged from between the two belts over the pulley 51.

A description will now be given of another mechanism which is employed to set the cotton plants into vibration in order to shake the lint from the bolls.

The shaft 31 is provided with a crank 62 near its middle, which crank receives the extremities of two connecting rods 63, extending in opposite directions. The other extremities of the connecting rods 63 are pivotally attached to horizontal slide bars 64 mounted longitudinally upon the top of the machine in bearings 65, one of which rests upon a bar 4 and the other upon the board 27. The extremities of the slide bars 64 each have pivotal connection with one of the arms of a bell crank lever 66. The bell cranks 66 are pivotally mounted at their apices, and have the extremities of their arms slotted to receive pivot pins. The slotted extremity of the other arm of each lever 66 engages a pin 67 upon the top surface of a transverse slide bar 68. The two slide bars 68 are provided with guides 69, carried by the beams 1 near their extremities. The length of the bars 68 is somewhat greater than the width of the machine, so that these bars will not be carried clear of the guides during the reciprocating motion which they are adapted to receive from the bell cranks, and slide rods 64. Both extremities of the rods 68 are turned downward, forming vertical portions 70 extending from top to bottom of the machine. The lower extremities of the members 70 are turned inward passing through the side walls of the machine, and forming bracket arms 71, carrying elongated bars 72 at their extremities. The bars 72 rest upon the guide boards 11 and are adapted to undergo an oscillating motion in unison due to the reciprocating motion communicated to the members 68. The bars 72 are positioned closely adjacent to the opposite edges of the guide boards 11, and the oscillating motion to which they are subjected is adapted to cause them to strike alternately against the stems of the plants which pass up between the guide boards. This causes the plants to be constantly shaken back and forth tending to free the lint from the cotton boll.

In Fig. 7 is illustrated another construction, which might be employed to communicate a vibratory motion to the cotton plants in order to shake the lint therefrom. This modification consists in a pair of adjacent boards 73 provided with teeth 74 upon their opposite edges, the teeth of one board being disposed oppositely to the spaces between the teeth of the other. The two boards 73 might be made to occupy the same position as the boards 11, causing the stems of the cotton plants to pass through the zig-zag passage between the boards during the travel of the machine, and thus communicating to said stems a rapid vibration.

The manner in which the machine operates is apparent from the above description. No propelling means is herein shown, but it is to be understood that the cotton picker may be drawn by horses, or some source of motive power may be mounted upon the frame. The belt 58 is driven by the pulley 50, and the belt 47 is driven partly by the pulley 49, and partly by its frictional contact with the belt 58.

It is to be observed that the application of this invention is not limited to use as a cotton picker, since it also may be used to remove boll weevils or other parasites from the plants.

Various changes may be made in the construction and proportions of parts without departing from the spirit of the invention, and the device is, therefore presented as including all such changes and modifications as may be included within the scope of the following claims.

What we claim is:

1. In a cotton and insect picker, the combination with a wheeled frame, of a plurality of bars projecting inwardly from the sides of said frame, having a length slightly greater than half the width of the frame, a pair of adjacent cylindrical brushes, rotatably mounted in the central lower portion of the frame, longitudinal with the machine, a mechanism adapted to communicate rotation to said brushes, a conveyer belt adapted to travel adjacent to each brush, means actuating the travel of the belt, and receptacles adapted to receive the contents of the belts.

2. In a cotton and insect picker, the combination with a wheeled frame, of a pair of spaced guide-boards, longitudinal with the machine in the middle lower portion thereof, a pair of elongated bars adapted to oscillate transversely above the guide-boards, means adapted to communicate an oscillating motion to said bars, a pair of adjacent cylindrical brushes rotatably mounted above said bars, and parallel with the same, a mechanism adapted to communicate rotation to the brushes, a conveyer belt adapted to travel adjacent to each brush, means actuating the travel of the belt, and receptacles adapted to receive the contents of the belts.

3. In a cotton and insect picker, the combination with a wheeled frame, of a pair of spaced guide-boards, longitudinal with the machine in the middle lower portion thereof, a pair of elongated bars adapted to oscillate transversely above the guide-boards, means adapted to communicate an oscillating motion to said bars, a pair of adjacent cylindrical brushes rotatably mounted above said bars and parallel with the same, a mechanism adapted to communicate rotation to the brushes, a conveyer belt adapted to travel adjacent to each brush, means actuating the travel of the belt, receptacles adapted to receive the contents of the belt, and a plurality of bars projecting from the sides of said frame, having a length slightly greater than half the width of the frame.

4. In a cotton and insect picker, the combination with a wheeled frame, of a plurality of bars projecting inwardly from the sides of said frame, having a length slightly greater than the width of the frame, a pair of adjacent cylindrical brushes rotatably mounted in the central lower portion of the frame, longitudinal with the machine, a mechanism adapted to communicate rotation to said brushes, an elongated comb acting in conjunction with each brush to remove the lint therefrom, a conveyer belt adapted to travel adjacent to each brush, said belt being upwardly inclined to the rear of the brushes, a traveling belt mounted in the rear portion of the frame, having a portion of its surface contacting with the upwardly inclined portion with said conveyer belt, means actuating the travel of these two belts, and receptacles adapted to receive the contents of the belts.

5. In a cotton and insect picker, the combination with a wheeled frame, of a pair of spaced guide-boards, longitudinal with the machine in the middle lower portion thereof, a pair of elongated bars adapted to oscillate transversely above the guide-boards, means adapted to communicate an oscillating motion to said bars, a pair of adjacent cylindrical brushes rotatably mounted above said bars, and parallel with the same, a mechanism adapted to communicate rotation to the brushes, an elongated comb adjacent to each brush, and contacting therewith, a conveyer belt adapted to travel adjacent to each brush, said belt being upwardly inclined to the rear of said brushes, a traveling belt mounted in the rear portion of the frame, having a portion of its surface contacting with the inclined portion of the conveyer belt, means actuating the travel of the two belts, and receptacles at the rear of the machine adapted to receive the contents of the two belts.

In testimony whereof we have signed our names to this specification in the presence of two subscribing witnesses.

EUGENE STILES SCHEBLE.
ELBERT ASCUE.

Witnesses:
H. B. HARRELL,
S. C. PADELFORD.

---

Copies of this patent may be obtained for five cents each, by addressing the "Commissioner of Patents, Washington, D. C."